US012796596B2

(12) United States Patent
Chen et al.

(10) Patent No.: US 12,796,596 B2
(45) Date of Patent: Nov. 17, 2026

(54) REAR-MOVING POWER TOOL

(71) Applicant: Nanjing Chervon Industry Co., Ltd., Nanjing (CN)

(72) Inventors: Mingyang Chen, Nanjing (CN); Yazhou Geng, Nanjing (CN); Haishen Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 369 days.

(21) Appl. No.: 18/495,131

(22) Filed: Oct. 26, 2023

(65) Prior Publication Data

US 2024/0206385 A1 Jun. 27, 2024

(30) Foreign Application Priority Data

Dec. 27, 2022 (CN) ......................... 202211682903.3
Sep. 18, 2023 (CN) ......................... 202311205173.2

(51) Int. Cl.

*A01D 34/69* (2006.01)
*A01D 34/00* (2006.01)
*A01D 34/68* (2006.01)
*A01D 34/78* (2006.01)

(52) U.S. Cl.

CPC ........... *A01D 34/69* (2013.01); *A01D 34/008* (2013.01); *A01D 34/6806* (2013.01); *A01D 2034/6843* (2013.01); *A01D 34/78* (2013.01)

(58) Field of Classification Search

CPC .. A01D 34/69; A01D 34/008; A01D 34/6808; A01D 2034/6843
See application file for complete search history.

(56) References Cited

U.S. PATENT DOCUMENTS

| | | | | |
|---|---|---|---|---|
| 5,375,674 A * | 12/1994 | Peter | A01D 34/6806 56/11.1 |
| 2004/0053742 A1* | 3/2004 | Schaedler | F16H 61/2807 477/88 |
| 2018/0095608 A1* | 4/2018 | Jablonski | G06F 3/04817 |
| 2019/0230852 A1* | 8/2019 | Curtis | A01D 34/6806 |
| 2021/0051848 A1 | 2/2021 | Bejcek | |
| 2021/0337727 A1* | 11/2021 | Dong | A01D 34/008 |

FOREIGN PATENT DOCUMENTS

| | | | | |
|---|---|---|---|---|
| CN | 203194380 U | 9/2013 | |
| CN | 105425788 A | 3/2016 | |
| CN | 107487228 A | 12/2017 | |
| CN | 211458028 U | 9/2020 | |
| CN | 112293031 B | 2/2021 | |
| EP | 1550364 A2 * | 7/2005 | A01D 34/6806 |
| EP | 3864950 A1 | 8/2021 | |
| EP | 3987906 A1 | 4/2024 | |
| WO | 2017215051 A1 | 12/2017 | |

* cited by examiner

*Primary Examiner* — Adam J Behrens
(74) *Attorney, Agent, or Firm* — Greenberg Traurig, LLP

(57) ABSTRACT

A rear-moving power tool includes a walking assembly including walking wheels; and a motor configured to drive the walking assembly. The rear-moving power tool has a self-propelled mode, where the self-propelled mode includes a first self-propelled state and a second self-propelled state; and in the second self-propelled state, the motor is capable of rotating at at least one constant rotational speed set according to a parameter of the rear-moving power tool during walking in the first self-propelled state.

15 Claims, 6 Drawing Sheets

REAR-MOVING POWER TOOL

RELATED APPLICATION INFORMATION

This application claims the benefit under 35 U.S.C. § 119(a) of Chinese Patent Application No. CN 202211682903.3, filed on Dec. 27, 2022 and Chinese Patent Application No. CN 202311205173.2, filed on Sep. 18, 2023, which applications are incorporated herein by reference in their entireties.

TECHNICAL FIELD

The present application relates to a rear-moving power tool and, in particular, to a mower.

BACKGROUND

Rear-moving power tools such as mowers are also referred to as weed trimmers, grass trimmers, lawn trimmers and so on. A mower is a mechanical tool for trimming lawns, vegetation and the like and includes a chassis, a motor, a walking assembly, a cutting assembly and a handle device. The motor is installed on the chassis of the mower, a cutter is installed on an output shaft of the motor, and the cutter utilizes the rotation of the motor to increase a working speed greatly, saving the operation time of a weeding worker and a lot of human resources.

In the existing art, to save the labor of a user to operate a rear-moving power tool, the rear-moving power tool is provided with a motor for driving the walking assembly to walk. When the user pushes the rear-moving power tool to work, the walking assembly of the rear-moving power tool is driven by the motor, and the rear-moving power tool automatically walks on the ground. The rear-moving power tool walks at a speed preset by a factory. When the user walks behind the rear-moving power tool, the user needs to adjust his or her own step according to the speed at which the rear-moving power tool walks and cannot walk at a constant speed suitable for the user. The rear-moving power tool is inconvenient for the user to use and time-consuming and labor-consuming to operate.

SUMMARY

The present application provides a rear-moving power tool, including a walking assembly including walking wheels; and a motor configured to drive the walking assembly. The rear-moving power tool has a self-propelled mode, where the self-propelled mode includes a first self-propelled state and a second self-propelled state; and in the second self-propelled state, the motor is capable of rotating at at least one constant rotational speed set according to a parameter of the rear-moving power tool during walking in the first self-propelled state.

In some examples, the rear-moving power tool includes a control module configured to initiate the self-propelled mode through a first operation.

In some examples, the rear-moving power tool includes a first operating member for a user to operate so that the rear-moving power tool enters the first self-propelled state.

In some examples, the first operation is an operation performed by the user on the first operating member.

In some examples, the rear-moving power tool includes a second operating member for a user to operate so that the rear-moving power tool enters the second self-propelled state.

In some examples, the second operating member is configured to be operated in the first self-propelled state so that the rear-moving power tool enters the second self-propelled state.

In some examples, the second operating member is configured to be operated in the second self-propelled state so that the rear-moving power tool enters the first self-propelled state.

In some examples, the first operation includes an operation performed by the user on the second operating member.

In some examples, the first operating member is configured to be operated in the first self-propelled state so that the rear-moving power tool enters the second self-propelled state.

In some examples, the rear-moving power tool includes a speed adjustment member for a user to operate so that the motor switches between different constant rotational speeds in the second self-propelled state.

In some examples, the speed adjustment member is a toggle, a button, a knob or a touch switch.

In some examples, the rear-moving power tool includes a sensing module, where in the first self-propelled state, the sensing module senses at least one parameter of the rear-moving power tool during walking so that a rotational speed of the motor automatically adapts to a walking speed of a user.

In some examples, the rear-moving power tool includes a handle device for the user to hold, where in the first self-propelled state, the sensing module directly or indirectly senses a thrust applied by the user to the handle device so that the rotational speed of the motor automatically adapts to the walking speed of the user.

The present application provides a rear-moving power tool, including a walking assembly including walking wheels; and a motor configured to drive the walking assembly. The rear-moving power tool has a self-propelled mode, where the self-propelled mode includes a first self-propelled state and a second self-propelled state; and in the second self-propelled state, the walking assembly is capable of walking at at least one constant speed set according to a parameter of the rear-moving power tool during walking in the first self-propelled state.

In some examples, the rear-moving power tool includes a sensing module and a handle device for a user to hold, where in the first self-propelled state, the sensing module directly or indirectly senses a thrust applied by the user to the handle device so that a walking speed of the walking assembly automatically adapts to a walking speed of the user.

DETAILED DESCRIPTION

Figure 1:
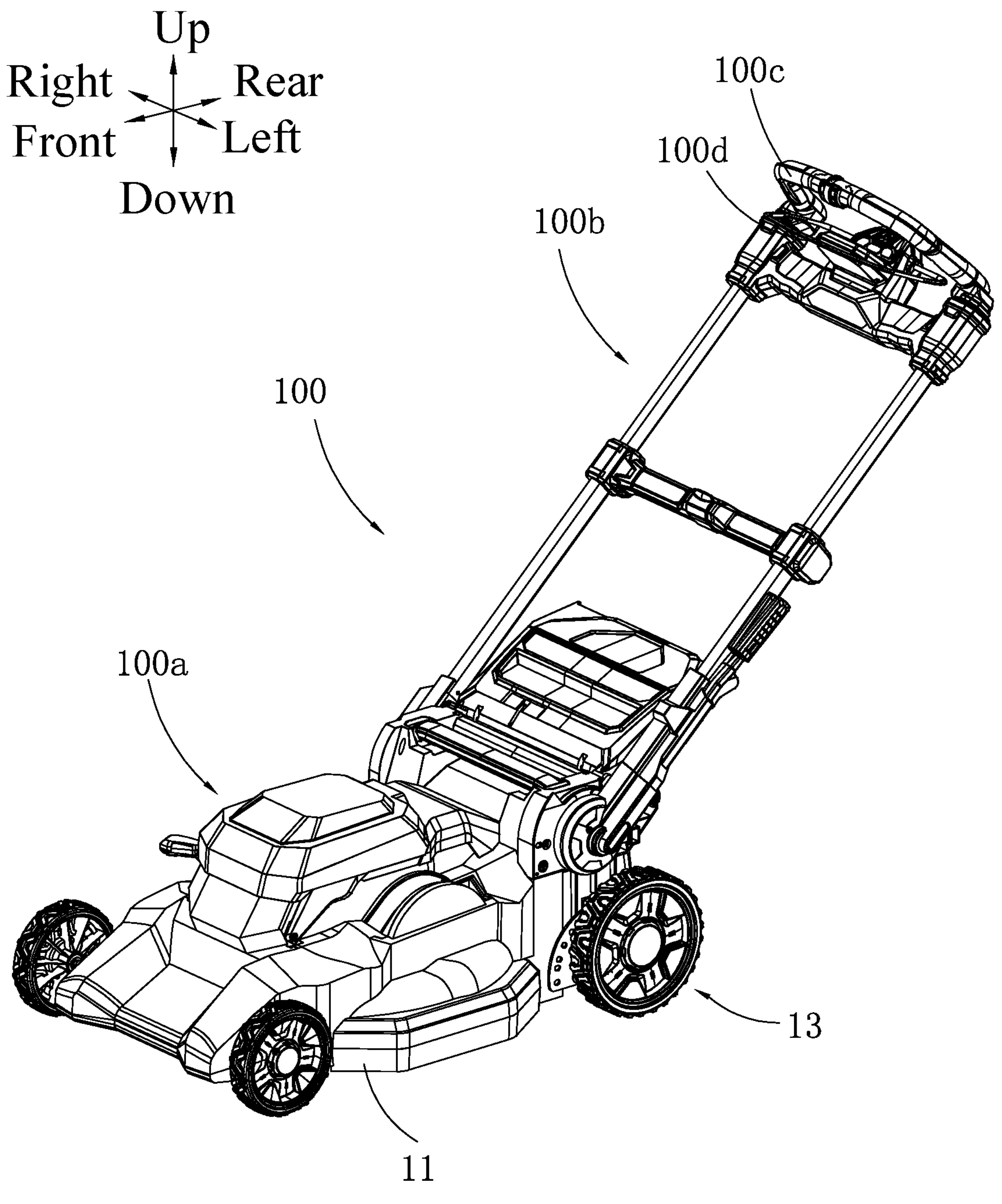
FIG. 1 is a perspective view of a rear-moving power tool according to an example of the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

The rear-moving power tool 100 shown in FIG. 1 may specifically be a mower, a snow thrower, a trolley or another machine with a walking function. In this example, the rear-moving power tool is the mower for a user to cut grass in a lawn, such as a lawn of a garden, a golf course or the like. The grass in the lawn requires regular care and thus needs to be often cut with the mower. When the user operates the mower, the user stands behind the mower and pushes the mower to walk on the ground.

Figure 2:
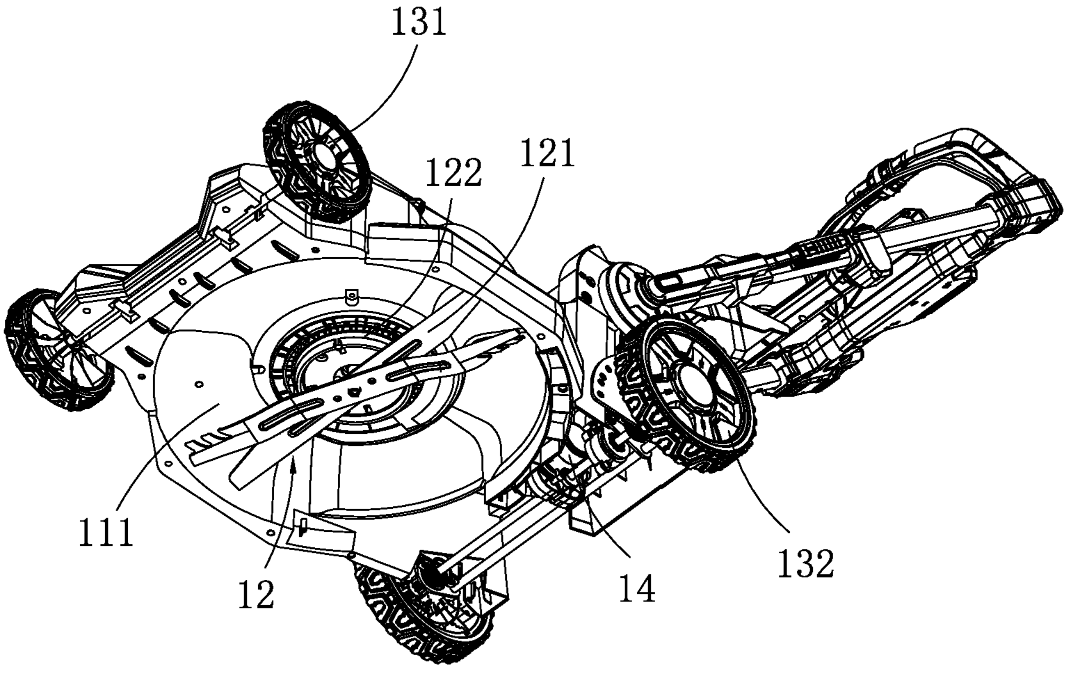
FIG. 2 is a perspective view of the rear-moving power tool of FIG. 1 from another angle.

As shown in FIGS. 1 and 2, the rear-moving power tool 100 includes a body 100*a* and a handle device 100*b*, where the handle device 100*b* is connected on the rear side of the body 100*a* and configured to be held by the user. The handle device 100*b* includes an operating handle 100*c*. The operating handle 100*c* is used for the user to operate the rear-moving power tool 100 by hand. The rear-moving power tool 100 further includes an energy device, where the energy device is a battery pack for supplying a power source to the rear-moving power tool 100. In some examples, the energy device may be connected to a mains grid. In some examples, the energy device may be connected to a fuel tank, where fuel in the fuel tank can supply energy to the rear-moving power tool 100.

The body 100*a* includes a chassis 11, a cutting assembly 12 and a walking assembly 13, where the cutting assembly 12 includes a cutter 121 and a first motor 122, and the walking assembly 13 includes multiple walking wheels 131 and 132. In this example, the walking assembly 13 includes two front walking wheels 131 and two rear walking wheels 132. The chassis 11 is used for supporting the cutting assembly 12 and the walking assembly 13. The chassis 11 is also connected to the handle device 100*b*. The chassis 11 connects the handle device 100*b*, the cutting assembly 12 and the walking assembly 13 into a whole. The cutting assembly 12 is used for implementing a cutting function, an accommodation space 111 is formed on the lower side of the chassis 11, and the cutter 121 is disposed in the accommodation space 111. In this example, the cutter 121 is a blade disposed in the accommodation space 111. The first motor 122 is mounted to the chassis 11, the cutter 121 is mounted to the first motor 122, and the first motor 122 drives the cutter 121 to rotate at a high speed to cut the grass in the lawn. The walking assembly 13 can drive the rear-moving power tool 100 to walk on the ground, and the walking assembly 13 can at least drive the rear-moving power tool 100 to advance, retreat and turn on the ground. The rear-moving power tool 100 further includes a second motor 14 for driving the walking assembly 13 to move. In this example, the second motor 14 is configured to drive the rear walking wheels 132 to rotate so that the rear-moving power tool 100 walks on the ground. The first motor 122 and the second motor 14 are electric motors. In other examples, the second motor 14 may be configured to drive the front walking wheels 131 to rotate. In some examples, the rear-moving power tool 100 includes a front motor and a rear motor, where the front motor drives the front walking wheels 131, and the rear motor drives the rear walking wheels 132. In some examples, the rear-moving power tool 100 includes one motor for driving the cutter 121 and the walking assembly 13.

The rear-moving power tool 100 has a self-propelled mode. When the rear-moving power tool 100 is in the self-propelled mode, the second motor 14 is started and the second motor 14 drives the walking assembly 13 to rotate to drive the rear-moving power tool 100 to walk on the ground. In this manner, when the user needs to mow the grass, the user just needs to stand behind the rear-moving power tool 100 and walk after the rear-moving power tool 100, the rear-moving power tool 100 is driven by the second motor 14 to automatically advance, and the user does not need to manually push the rear-moving power tool 100 to walk on the ground, thereby saving the labor of the user and improving working efficiency.

Different users have different walking speeds, and the same user may have different walking speeds at different times. Therefore, the user requires the rear-moving power tool 100 to walk at a speed suitable for the user so that the walking step of the user can be kept substantially consistent with the walking speed of the rear-moving power tool 100, and the user can easily walk after the rear-moving power tool 100. When the user steps relatively fast, the rear-moving power tool 100 may walk at a relatively large speed. When the user steps relatively slowly, the rear-moving power tool 100 may walk at a relatively small speed. In this manner, the user does not need to chase or wait for the rear-moving power tool 100 and operates conveniently. Different species of grass require different cutting times. The user may need to set an appropriate cutting speed for a certain species of grass. When cutting relatively hard grass, the rear-moving power tool 100 may walk at a relatively small speed, so as to improve a cutting effect. When cutting relatively soft grass, the rear-moving power tool 100 may walk at a relatively large speed, so as to improve cutting efficiency. Thus, the user needs to adjust a self-propelled speed of the rear-moving power tool 100 according to different situations.

Figure 3:
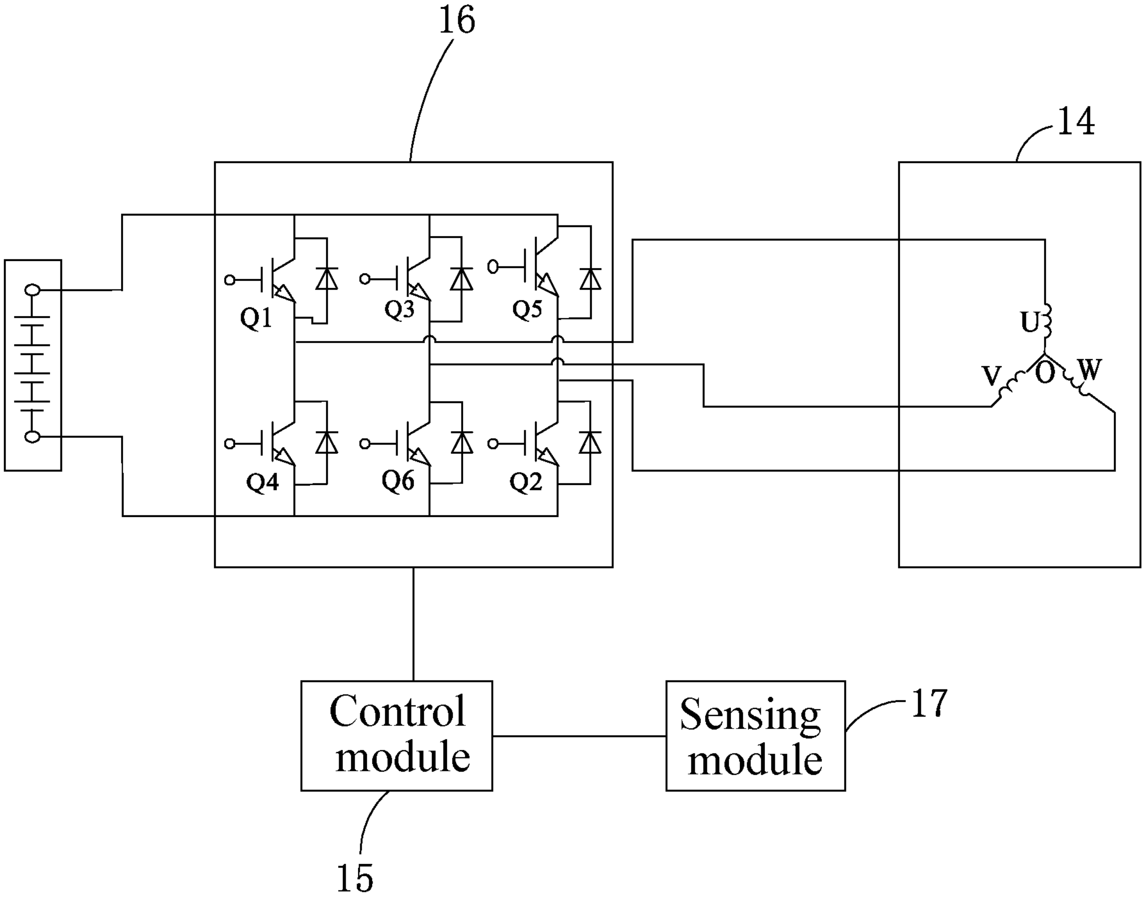
FIG. 3 is a circuit diagram of the rear-moving power tool of FIG. 1.

As shown in FIG. 3, the rear-moving power tool 100 includes a control module 15, a sensing module 17 and a driver circuit 16. The control module 15 controls the operation of the first motor 122 and the second motor 14. The sensing module 17 is used for acquiring a parameter signal of the rear-moving power tool 100. The control module 15 is integrated with a signal processing unit for processing the related parameter signal acquired by the sensing module 17. The signal processing unit has functions such as computation, comparison and determination. After the signal processing unit processes the signal, a control signal can be generated and output to the driver circuit 16 to drive the second motor 14 to operate. The driver circuit 16 is electrically connected to the control module 15 and the second motor 14, and the driver circuit 16 can drive the operation of the second motor 14 according to the control signal output from the control module 15. In some examples, the control module 15 adopts a dedicated controller such as some dedicated control chips (for example, a microcontroller unit (MCU)). The driver circuit 16 includes switch elements VT1, VT2, VT3, VT4, VT5 and VT6. The switch elements VT1, VT2, VT3, VT4, VT5 and VT6 form a three-phase bridge, where VT1, VT3 and VT5 are high-side switches, and VT2, VT4 and VT6 are low-side switches. Field-effect transistors, insulated-gate bipolar transistors (IGBTs) and the like may be selected as the switch elements VT1 to VT6. Control terminals of the switch elements are electrically connected to the control module 15, separately. The switch elements VT1 to VT6 change on states according to drive signals output from the control module 15, so as to change states of a voltage and/or a current applied by the energy device to windings of the second motor 14 and drive the second motor 14 to operate.

The control module 15 initiates the self-propelled mode through a first operation. The first operation is an operation action of the user. When the user performs the first operation, the control module 15 initiates the self-propelled mode. The self-propelled mode includes a first self-propelled state and a second self-propelled state.

In the first self-propelled state, the sensing module 17 senses at least one parameter of the rear-moving power tool 100 during walking so that a rotational speed of the second motor 14 automatically adapts to a walking speed of the user. The rotational speed of the second motor 14 automatically adapts to the walking speed of the user so that a walking speed of the walking assembly 13 is consistent with the speed at which the user walks after the rear-moving power tool 100, and the user walks more comfortably and can feel less pulled or hindered. The first self-propelled state may be understood as, but is not limited to, a servo self-propelled state.

In some examples, the sensing module 17 includes a pressure sensor disposed on the operating handle 100*c* to sense a press of the user. The sensing module 17 directly senses a thrust applied by the user to the handle device 100*b* so that the control module 15 controls the rotational speed of the second motor 14 to automatically adapt to the walking speed of the user. In some examples, the parameter of the rear-moving power tool 100 during walking includes a current, a voltage, a speed, acceleration, a distance, an angle or the ratio of these parameters. The sensing module 17 indirectly calculates the thrust applied by the user to the handle device 100*b* by sensing the current, voltage, speed, acceleration, distance, angle or ratio of these parameters so that the control module 15 controls the rotational speed of the second motor 14 to automatically adapt to the walking speed of the user. In some examples, the sensing module 17 directly senses the current, voltage, speed, acceleration, distance, angle or ratio of these parameters so that the control module 15 controls the rotational speed of the second motor 14 to automatically adapt to the walking speed of the user.

In the first self-propelled state, the user pushes, according to personal habits or requirements under the working condition, the rear-moving power tool 100 to walk, and the walking assembly 13 automatically adapts to the step of the user. Since it is difficult for the user to keep walking at a constant speed in a working process, the walking speed of the rear-moving power tool 100 is inconstant. Although the walking speed of the walking assembly 13 is consistent with the step of the user and the user operates comfortably, the inconstant walking speed may cause unstable cutting quality and an irregular lawn. Additionally, the control module 15 needs to control the rotational speed of the second motor 14 according to feedback from the user at all times, and the energy device consumes energy fast and endures for a short time. Therefore, the user needs to set, for the rear-moving power tool 100, a stable walking speed suitable for the user.

In the second self-propelled state, the second motor 14 can rotate at at least one constant rotational speed. The constant rotational speed is set according to the parameter of the rear-moving power tool 100 during walking in the first self-propelled state. In the first self-propelled state, the parameter of the rear-moving power tool 100 during walking includes the rotational speed of the second motor 14. The user may select one or more walking speeds of the walking assembly 13 in the first self-propelled state and use the selected one or more walking speeds as constant walking speeds of the walking assembly 13 in the second self-propelled state. In some examples, the user uses the rotational speed of the second motor 14 at the time of switching from the first self-propelled state to the second self-propelled state as a constant rotational speed of the second motor 14 in the second self-propelled state. In this manner, when the user finds a speed suitable for the personal habits or the current working condition in the first self-propelled state, the rear-moving power tool may switch to the second self-propelled state and use the suitable speed with high working efficiency and high working quality as a constant walking speed in the second self-propelled state. The second self-propelled state may be understood as, but is not limited to, a customized self-propelled state. In some examples, in the first self-propelled state, the parameter of the rear-moving power tool 100 during walking includes the current, voltage, speed, acceleration, distance, angle or ratio of these parameters.

In some examples, the user does not need to subjectively select the suitable walking speed. The rear-moving power tool 100 may automatically obtain an ideal walking speed for the user through machine learning. The rear-moving power tool 100 may automatically calculate and analyze an average rotational speed of the second motor 14 within a period of time in the first self-propelled state and directly or indirectly use the analyzed rotational speed as the constant rotational speed of the second motor 14 in the second self-propelled state. The rotational speed of the second motor 14 in the first self-propelled state is used for determining the constant rotational speed of the second motor 14 in the second self-propelled state, and the rear-moving power tool 100 cruises at a constant speed suitable for the user in the second self-propelled state. Without repeatedly adjusting and testing the walking speed of the rear-moving power tool 100, the user can find the constant speed suitable for the user so that the rear-moving power tool 100 cruises at the constant speed and is simple and convenient to use.

Figure 4:
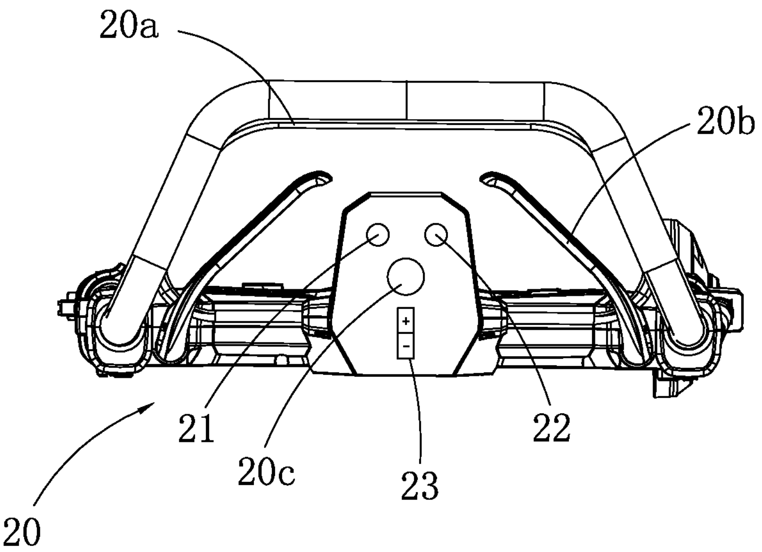
FIG. 4 is a perspective view of an operating handle and an operating portion of the rear-moving power tool of FIG. 1.
Figure 5:
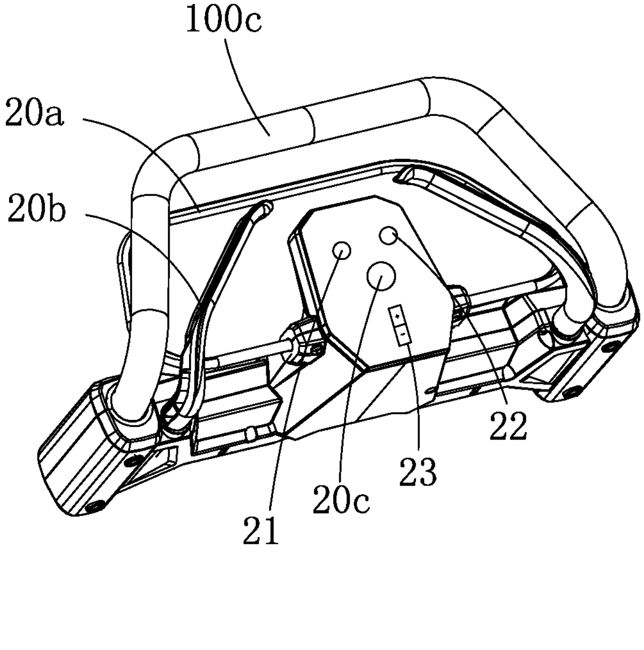
FIG. 5 is a perspective view of an operating handle and an operating portion of the rear-moving power tool of FIG. 1 from another angle.
Figure 6:
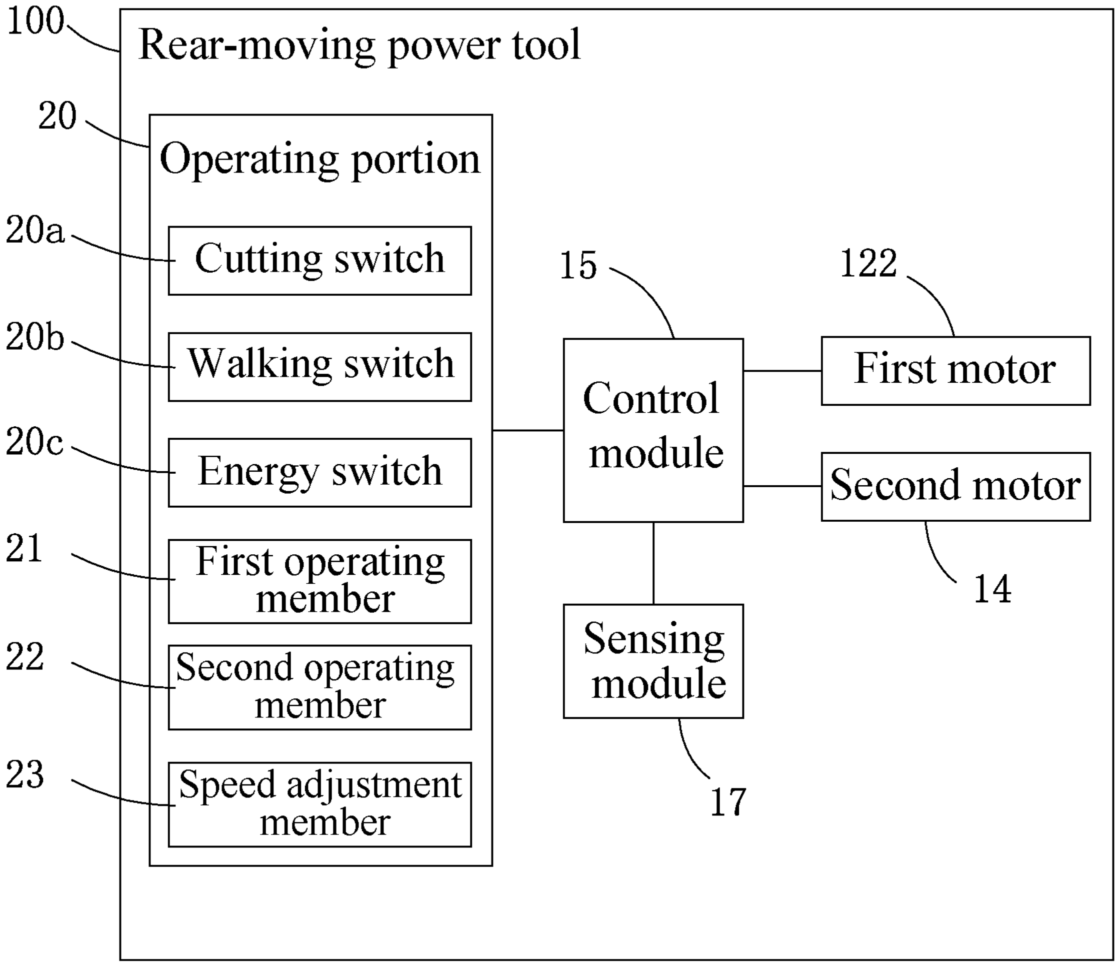
FIG. 6 is a logical control diagram of the rear-moving power tool of FIG. 1.

As shown in FIGS. 4 to 6, the rear-moving power tool 100 includes an operating portion 20 for the user to operate. The operating portion 20 is disposed on the operating handle 100*c* and spans the operating handle 100*c* in a left and right direction. The operating portion 20 includes an energy switch 20*c*, a cutting switch 20*a* and a walking switch 20*b*. The energy switch 20*c* is used for powering on the rear-moving power tool 100. The cutting switch 20*a* is used for controlling the rear-moving power tool 100 to mow grass, and the walking switch 20*b* is used for controlling the rear-moving power tool 100 to walk. In this example, the cutting switch 20*a* is disposed in front of the operating handle 100*c*, and the walking switch 20*b* is disposed behind the operating handle 100*c*. The cutting switch 20*a* is a trigger extending substantially along part of the operating handle 100*c*, and the trigger is rotatable relative to the operating handle 100*c*. The cutting switch 20*a* is configured to bias towards the front of the operating handle 100*c*. When the user presses the cutting switch 20*a* backward, the cutting switch 20*a* rotates, and the first motor 122 drives the cutter 121 to rotate to mow grass. The walking switch 20*b* includes a left switch and a right switch, where the left switch and the right switch are each a trigger extending substantially along part of the operating handle 100*c*. The left switch and the right switch are rotatable relative to the operating handle 100*c*. The walking switch 20*b* is configured to bias away from the operating handle 100*c*. When the user presses either the left switch or the right switch or both the left switch and the right switch towards the operating handle 100*c*, the walking switch 20*b* rotates, and the second motor 14 is allowed to drive the walking wheels 131 and 132 to rotate to walk on the ground. In some examples, the walking switch 20*b* includes only one switch. In some examples, the walking switch 20*b* is disposed in front of the operating handle 100*c*, and the cutting switch 20*a* is disposed behind the operating handle 100*c*. In some examples, part of the operating portion 20 is formed on the body 100*a*.

Figure 7:
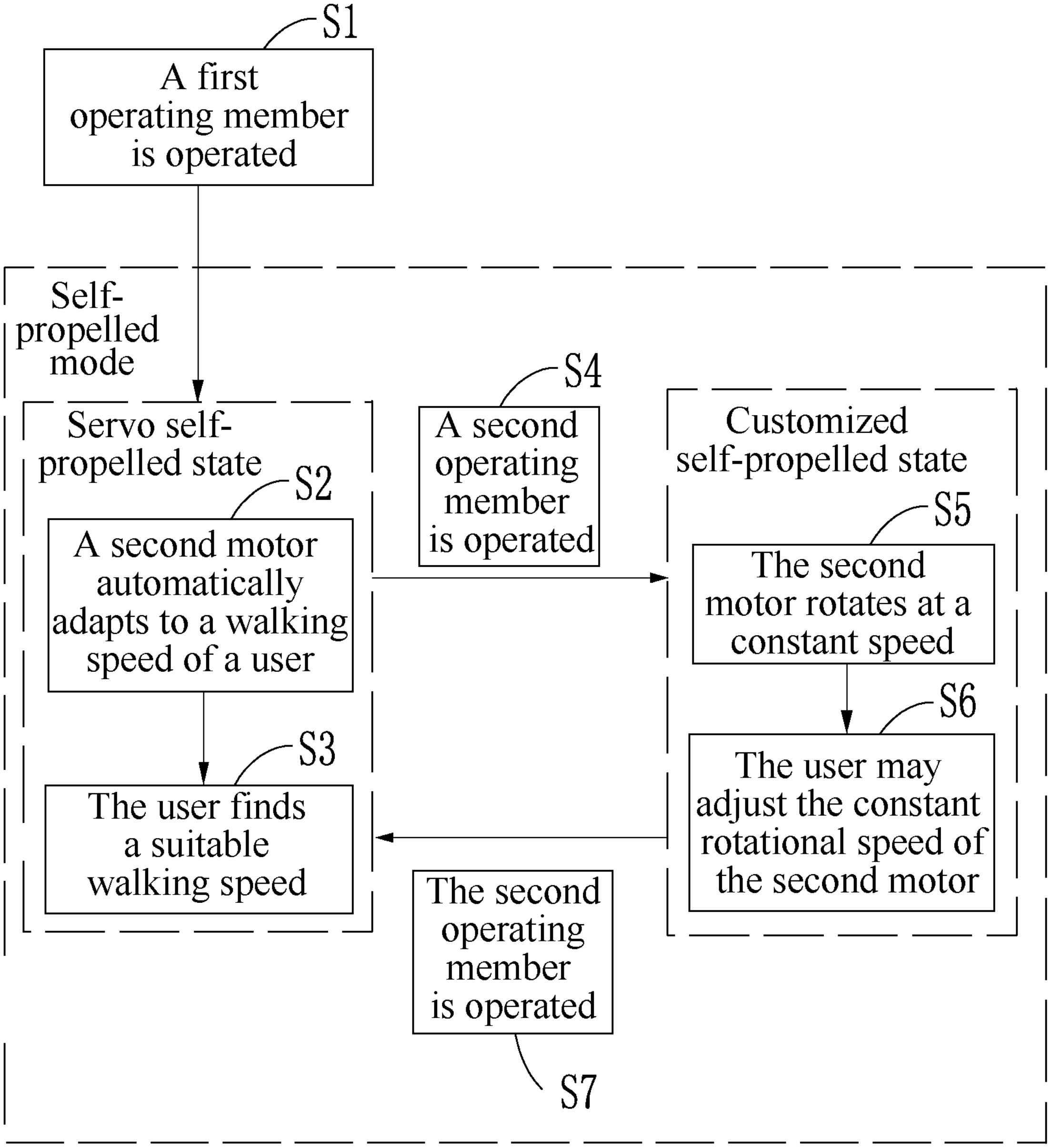
FIG. 7 is a flowchart of the rear-moving power tool of FIG. 1 in a self-propelled mode.

The operating portion 20 includes a first operating member 21 and a second operating member 22. The first operating member 21 is configured to be operated by the user so that the rear-moving power tool 100 enters the first self-propelled state. The second operating member 22 is configured to be operated by the user so that the rear-moving power tool 100 enters the second self-propelled state. The control module 15 initiates the self-propelled mode through the first operation. In this example, the first operation is an operation performed by the user on the first operating member 21. The first operating member 21 is configured to be a pushbutton. As shown in FIG. 7, in step S1, when the user presses the first operating member 21, the rear-moving power tool 100 enters the self-propelled mode and the first self-propelled state at the same time. In the first self-propelled state, in step S2, the second motor 14 automatically adapts to the walking speed of the user. The second operating member 22 is configured to be a pushbutton. When the user finds a suitable walking speed in the first self-propelled state in step S3, in step S4, the user may press the second operating member 22, and the rear-moving power tool 100 enters the second self-propelled state. In step S5, the rotational speed of the second motor 14 remains to be a rotational speed when the user presses the second operating member 22, and the walking assembly 13 rotates at a constant rotational speed suitable for the user. The user walks after the rear-moving power tool 100 at a constant speed.

As shown in FIGS. 4 and 5, the operating portion 20 includes a speed adjustment member 23. The speed adjustment member 23 is configured to be operated by the user so that the second motor 14 switches between different constant rotational speeds in the second self-propelled state. The speed adjustment member 23 includes an acceleration button and a deceleration button. The acceleration button and the deceleration button are configured to be pushbuttons. In step S6, when the user presses the acceleration button, the rotational speed of the second motor 14 increases, and the walking speed of the walking assembly 13 increases; when the user presses the deceleration button, the rotational speed of the second motor 14 decreases, and the walking speed of the walking assembly 13 decreases. The user may operate the speed adjustment member 23 multiple times to adjust the walking speed of the rear-moving power tool 100. In this manner, in the second self-propelled state, the user can easily operate the rear-moving power tool 100 to walk at different constant speeds so that different working conditions can be quickly dealt with. In some examples, the energy switch 20*c*, the first operating member 21, the second operating member 22 and the speed adjustment member 23 may each be configured to be a toggle, a button, a knob or an electronic switch, such as a touch switch.

As shown in FIG. 7, in the second self-propelled state, in step S7, the user presses the second operating member 22 again, and the rear-moving power tool 100 enters the first self-propelled state. The rear-moving power tool 100 exits the second self-propelled state and returns to the first self-propelled state, the rotational speed of the second motor 14 automatically adapts to the walking speed of the user, and the user controls the speed of the rear-moving power tool 100.

In some examples, the user can initiate and stop the self-propelled mode and switch the two self-propelled states through one operating member. The user presses the first operating member 21 for the first time so that the rear-moving power tool 100 enters the first self-propelled state. In the first self-propelled state, when the user presses the first operating member 21 for the second time, the rear-moving power tool 100 enters the second self-propelled state. In the second self-propelled state, when the user presses the first operating member 21 for the third time, the rear-moving power tool 100 enters the first self-propelled state. In some examples, the user operates the first operating member 21 for different operation durations to control the rear-moving power tool 100 to enter different self-propelled states. When the user presses the first operating member 21 for a long time, the rear-moving power tool 100 enters the first self-propelled state. When the user presses the first operating member 21 for a short time, the rear-moving power tool 100 enters the second self-propelled state. In some examples, the user initiates and stops the self-propelled mode and switches the two self-propelled states through more than two operating members.

In some examples, the control module 15 includes a storage unit. The user selects one or more commonly used constant speeds in the first self-propelled state and may store the one or more commonly used constant speeds in the storage unit. The startup or shutdown of the rear-moving power tool 100 does not affect the content stored in the storage unit. The first operation includes an operation performed by the user on the second operating member 22. When the user operates the rear-moving power tool 100 to enter the self-propelled mode, the rear-moving power tool 100 enters the second self-propelled state at the same time. In this manner, the user can shut down the rear-moving power tool 100 after storing the commonly used constant speeds. When the user starts up the rear-moving power tool 100 again, if the user desires to operate the rear-moving power tool 100 to walk at a previously stored constant speed, the user may directly press the second operating member 22, so as to enter the second self-propelled state, which is convenient and efficient to operate.

The self-propelled mode includes the first self-propelled state and the second self-propelled state, and the user may switch between the two states. When the user desires the rear-moving power tool 100 to walk at a constant speed, the rear-moving power tool 100 may enter the second self-propelled state. When the user desires the walking assembly 13 to automatically adapt to the walking speed of the user, the rear-moving power tool 100 may enter the first self-propelled state. When the user desires to change the constant speed, the user may re-select one speed in the first self-propelled state, and the rear-moving power tool 100 enters the second self-propelled state again and walks at the selected new constant speed. In this manner, the user can conveniently and comfortably operate the rear-moving power tool 100 to walk at a speed suitable for the user, thereby improving the working efficiency.

The basic principles, main features and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A rear-moving power tool, comprising:

a walking assembly comprising walking wheels;

a motor configured to drive the walking assembly;

a handle device for a user to hold, wherein the rear-moving power tool has a self-propelled mode, wherein the self-propelled mode comprises a first self-propelled state and a second self-propelled state; and a sensing module configured to sense in the first self-propelled state a parameter of the rear-moving power tool during walking so that a rotational speed of the motor automatically adapts to a walking speed of the user, wherein the sensing module is configured to sense in the first self-propelled state directly or indirectly a thrust applied by the user to the handle device so that the rotational speed of the motor automatically adapts to the walking speed of the user, wherein the rear-moving power tool is configured to rotate, in the second self-propelled state, the motor at at least one constant rotational speed, whereby the at least one constant rotational speed is set according to the parameter of the rear-moving power tool during walking in the first self-propelled state; wherein the parameter is the rotational speed the motor automatically adapted to in the first self-propelled state at the time of switching from the first self-propelled state to the second self-propelled state, or wherein the parameter is an average rotational speed determined within a period of time.

2. The rear-moving power tool of claim 1, comprising a control module configured to initiate the self-propelled mode through a first operation.

3. The rear-moving power tool of claim 2, comprising a first operating member for a user to operate so that the rear-moving power tool enters the first self-propelled state.

4. The rear-moving power tool of claim 3, wherein the first operation is an operation performed by the user on the first operating member.

5. The rear-moving power tool of claim 2, comprising a second operating member for a user to operate so that the rear-moving power tool enters the second self-propelled state.

6. The rear-moving power tool of claim 5, wherein the second operating member is configured to be operated in the first self-propelled state so that the rear-moving power tool enters the second self-propelled state.

7. The rear-moving power tool of claim 6, wherein the second operating member is configured to be operated in the second self-propelled state so that the rear-moving power tool enters the first self-propelled state.

8. The rear-moving power tool of claim 5, wherein the first operation comprises an operation performed by the user on the second operating member.

9. The rear-moving power tool of claim 3, wherein the first operating member is configured to be operated in the first self-propelled state so that the rear-moving power tool enters the second self-propelled state.

10. The rear-moving power tool of claim 1, comprising a speed adjustment member for a user to operate so that the motor switches between different constant rotational speeds in the second self-propelled state.

11. The rear-moving power tool of claim 10, wherein the speed adjustment member is a toggle, a button, a knob or a touch switch.

12. The rear-moving power tool of claim 1, wherein the parameter comprises a rotational speed of the motor.

13. The rear-moving power tool of claim 1, comprising a sensing module, wherein in the first self-propelled state, the sensing module senses the parameter of the rear-moving power tool during walking so that a rotational speed of the motor automatically adapts to a walking speed of a user.

14. The rear-moving power tool of claim 13, comprising a handle device for the user to hold, wherein in the first self-propelled state, the sensing module directly or indirectly senses a thrust applied by the user to the handle device so that the rotational speed of the motor automatically adapts to the walking speed of the user.

15. The rear-moving power tool of claim 3, wherein the first operating member is a button, a toggle, a knob or a touch switch.

* * * * *